(12) United States Patent
Ha (10) Patent No.: US 10,867,050 B2
(45) Date of Patent: *Dec. 15, 2020

(54) METHOD AND APPARATUS FOR GENERATING DYNAMIC SECURITY MODULE

(71) Applicants: EVERSPIN CORP., Seoul (KR); Young Bin Ha, Seoul (KR)

(72) Inventor: Young Bin Ha, Seoul (KR)

(73) Assignee: EVERSPIN CORP., Seoul (KR)

( * ) Notice: Subject to any disclaimer, the term of this patent is extended or adjusted under 35 U.S.C. 154(b) by 110 days.

This patent is subject to a terminal disclaimer.

(21) Appl. No.: 15/701,867

(22) Filed: Sep. 12, 2017

(65) Prior Publication Data

US 2018/0004940 A1 Jan. 4, 2018

Related U.S. Application Data

(63) Continuation of application No. PCT/KR2016/002537, filed on Mar. 14, 2016.

(30) Foreign Application Priority Data

Mar. 13, 2015 (KR) .................. 10-2015-0035177
Mar. 14, 2016 (KR) .................. 10-2016-0030572

(51) Int. Cl.
*G06F 21/57* (2013.01)
*G06F 21/51* (2013.01)
(Continued)

(52) U.S. Cl.
CPC ............ *G06F 21/577* (2013.01); *G06F 21/14* (2013.01); *G06F 21/50* (2013.01); *G06F 21/51* (2013.01);
(Continued)

(58) Field of Classification Search
CPC .... G06F 21/577; G06F 21/567; G06F 21/566; G06F 21/554; G06F 21/14; G06F 21/54;
(Continued)

(56) References Cited

U.S. PATENT DOCUMENTS 5,708,709 A * 1/1998 Rose .................... G06F 8/61
380/30
9,087,189 B1 * 7/2015 Koeten .................. H04L 67/10
(Continued)

FOREIGN PATENT DOCUMENTS

KR 10-0956823 B1 5/2010
KR 10-1204726 B1 11/2012
(Continued)

*Primary Examiner* — Meng Li
(74) *Attorney, Agent, or Firm* — Nelson Mullins Riley & Scarborough LLP; Kongsik Kim, Esq.

(57) ABSTRACT

Disclosed herein are a method and apparatus for generating a dynamic security module which is allocated to a user terminal so that code configured to be executed on the user terminal for security varies with execution time. The method includes allocating a predetermined value to at least one of variables as which parts or all of variable portions of code constituting a dynamic security module have been designated. Part or all of the code constituting the dynamic security module transmitted to a user terminal has a predetermined valid period.

13 Claims, 9 Drawing Sheets

(51) Int. Cl.
*G06F 21/52* (2013.01)
*G06F 21/50* (2013.01)
*H04L 29/08* (2006.01)
*G06F 21/56* (2013.01)
*G06F 21/14* (2013.01)
*G06F 21/55* (2013.01)
*H04L 29/06* (2006.01)
*G06F 21/54* (2013.01)

(52) U.S. Cl.
CPC ............. *G06F 21/52* (2013.01); *G06F 21/54* (2013.01); *G06F 21/554* (2013.01); *G06F 21/566* (2013.01); *G06F 21/567* (2013.01); *G06F 21/57* (2013.01); *H04L 63/1425* (2013.01); *H04L 63/1433* (2013.01); *H04L 63/1441* (2013.01); *H04L 67/141* (2013.01); *H04L 67/146* (2013.01); *G06F 2221/033* (2013.01); *G06F 2221/2137* (2013.01); *H04L 63/20* (2013.01); *H04L 67/14* (2013.01)

(58) Field of Classification Search
CPC .......... G06F 21/57; G06F 21/52; G06F 21/51; G06F 21/50; G06F 2221/2137; G06F 2221/033; H04L 67/141; H04L 67/146; H04L 63/1425; H04L 63/1441; H04L 63/1433; H04L 67/14; H04L 63/20
See application file for complete search history.

(56) References Cited

U.S. PATENT DOCUMENTS

| | | | |
|---|---|---|---|
| 9,722,973 B1* | 8/2017 | Kothari | H04L 63/0428 |
| 2004/0003278 A1* | 1/2004 | Chen | G06F 21/14 |
| | | | 726/21 |
| 2004/0103323 A1* | 5/2004 | Dominic | H04L 63/126 |
| | | | 726/4 |
| 2007/0067301 A1* | 3/2007 | Malik | G06F 21/6218 |
| 2008/0052766 A1* | 2/2008 | Esperet | H04L 63/0272 |
| | | | 726/3 |
| 2014/0283038 A1* | 9/2014 | Call | H04L 63/1441 |
| | | | 726/22 |
| 2015/0067830 A1* | 3/2015 | Johansson | G06Q 30/0601 |
| | | | 726/22 |

FOREIGN PATENT DOCUMENTS

| | | |
|---|---|---|
| KR | 10-2013-0101657 A | 9/2013 |
| KR | 10-2014-0023098 A | 2/2014 |
| KR | 10-2014-0071744 A | 6/2014 |
| KR | 10-2014-0127987 A | 11/2014 |

\* cited by examiner

```
int two_times(x) {
    return 2*x;
} int three_more(x) {
    return x + 3;
} int result(x) {
    return two_times(x) * three_more(x);
}
```

```
int <%=TWO_TIMES%>(x) {
    return 2*x;
} int <%=THREE_MORE%>(x) {
    return x + 3;
} int result(x) {
    return <%=TWO_TIMES%>(x) * <%=THREE_MORE%>(x);
}
```

```
TWO_TIMES=random character string
THREE_MORE=random character string
```

FIG. 5

```
<%
case SUM_ALGORIGTHM_IDX
when 0
%>
int sum(a) {
   int i, s = 0;
   for (i = 1; i <= a; i++)
      s += i;
   return s;
}
<%
when 1
%>
int sum(a) {
   int s = 0;
   while (a > 0)
      s += a--;
   return s;
}
<%
when 2
%>
int sum(a) {
   if (a == 0)
      return 0;
   return a + sum(a - 1);
}
<%
end
%>
```

```
SUM_ALGORIGTHM_IDX=rand(3)
```

FIG. 6

```
CFLAGS=-g -O<%=OPTIMIZATION_LEVEL%>
```

```
OPTIMIZATION_LEVEL=['0', '1', '2', 's'].sample
```

FIG. 7

| session_id | param1 | param2 | param3 | state1 | state2 |
|---|---|---|---|---|---|
| 11836381 | A | B | C | 1 | 2 |
| 72365784 | C | B | A | 0 | 3 |
| 87656501 | B | A | C | 3 | 2 |

FIG. 8

| pants: brown
shirts: white
hat: black | | |
|---|---|---|

| aaa: brown
bbb: white
ccc: black | hat: brown
paants: white
haat: black | KV3gLmDj: brown
uSqU3cdK: white
7/wETz94: black |
|---|---|---|

FIG. 9

| A -> B -> C -> D | | |
|---|---|---|
| A -> D -> B -> C | D -> C -> B -> A | B -> A -> D -> C |

METHOD AND APPARATUS FOR GENERATING DYNAMIC SECURITY MODULE

CROSS-REFERENCE TO RELATED APPLICATION

This application is a continuation of PCT/KR2016/002537 filed on Mar. 14, 2016, which claims priority to Korean Patent Application Nos. 10-2015-0035177 and 10-2016-0030572 filed on Mar. 13, 2015 and Mar. 14, 2016, respectively, which applications are incorporated herein by reference.

TECHNICAL FIELD

The present invention relates to a method and apparatus for generating a dynamic security module, and more specifically to a method and apparatus for generating a dynamic security module, in which dynamic security modules in each of which part or all of source code performing security management has a predetermined valid period are generated and transmitted to the security client of a user terminal, and security modules for various types of application programs of the user terminal are allowed to be frequently updated, thereby making the hacking of the application programs difficult and thus significantly improving the security of the user terminal.

BACKGROUND ART

Recently, smartphones, which are mobile terminals, have become necessities essential for the life of today, and have been widely popularized all over the world. However, as the security vulnerability of smartphones has been continuously revealed, attacks via malicious applications have been rapidly increasing.

Hackers develop malicious applications for mobile terminals, insert malware into the malicious applications, and distribute the malicious applications disguised as normal applications to general users via open markets or the Internet. When a malicious application is installed on a mobile terminal, the malicious application inside the mobile terminal may attempt an attack for leaking not only personal information, such as Short Message Service (SMS) transmission and reception information, a telephone directory, Internet access records, etc., but also financial information, such as a mobile accredited certificate used for mobile banking, etc., to an external server without the knowledge of a user.

When an application is executed, most application security solutions invoke security logic and respond with results while communicating with the security module of the application. However, when communication with the security module is forcibly blocked or the security module is disarmed by an altered application by an attack of a hacker, fatal vulnerability related to personal information and financial information occurs.

Therefore, there is an urgent demand for the development of technology which can overcome a security vulnerability problem in a mobile terminal-based user environment widely popularized recently both locally and internationally and which can improve the security of various types of software included in user terminals.

SUMMARY OF THE DISCLOSURE

Accordingly, the present invention has been made to overcome the above-described problems of the prior art, and an object of the present invention is to provide a method and apparatus for generating a dynamic security module, in which dynamic security modules in each of which part or all of source code performing security management has a predetermined valid period are generated and transmitted to the security client of a user terminal, and security modules for various types of application programs of the user terminal are allowed to be frequently updated, thereby making the hacking of the application programs difficult and thus significantly improving the security of the user terminal.

According to an aspect of the present invention, there is provided a method of generating a dynamic security module which is allocated to a user terminal so that code configured to be executed on the user terminal for security varies with execution time, the method including: allocating a predetermined value to at least one of variables as which parts or all of variable portions of code constituting a dynamic security module have been designated; wherein part or all of the code constituting the dynamic security module transmitted to a user terminal has a predetermined valid period.

Each of the variable portions of the dynamic security module may be a code capable of varying at least one element selected from the group consisting of a function name of the code, a variable designating an algorithm to be executed, a protocol field, a variable designating a protocol sequence, a variable designating a compile level, and a variable designating an executable code obfuscation method.

The predetermined valid period may be configured to delete the part or all of the code or block the use of the part or all of the code when the predetermined valid period expires.

The method may further include: creating a security session with a security client of the user terminal; and transmitting the dynamic security module to the security client of the user terminal in which the security session has been created.

The method may further include receiving security management results from the dynamic security module transmitted to the security client, examining the received security management results, and transmitting a security management examination result value to the dynamic security module of the security client.

The method may further include transmitting a stop command to stop the running of an application program of the user terminal to the dynamic security module of the security client when a security problem has occurred in the user terminal.

The security session may be created by generating a session ID as a security session ID and then transmitting the session ID to the security client so that the security client stores the session ID.

The method may further include storing the parameters of the dynamic security module transmitted to the security client while the security session has been maintained.

The method may further include verifying whether details transmitted from the security client are the same as the configuration of parameters of the dynamic security module.

According to another aspect of the present invention, there is provided an apparatus for generating a dynamic security module which is allocated to a user terminal so that code configured to be executed on the user terminal for security varies with execution time, the apparatus including: a communication unit configured to transmit and receive a security management event over a network; and a processor configured to control the communication unit; wherein the processor allocates a predetermined value to at least one of variables as which parts or all of variable portions of code constituting a dynamic security module have been designated, and part or all of the code constituting the dynamic security module transmitted to the user terminal has a predetermined valid period.

Each of the variable portions of the dynamic security module may be a code capable of varying at least one element selected from the group consisting of a function name of the code, a variable designating an algorithm to be executed, a protocol field, a variable designating a protocol sequence, a variable designating a compile level, and a variable designating an executable code obfuscation method.

The processor may be further configured to: create a security session with a security client of the user terminal; and transmit the dynamic security module to the security client of the user terminal in which the security session has been created.

The processor may be further configured to: receive security management results from the dynamic security module transmitted to the security client; examine the received security management results; and transmit a security management examination result value to the dynamic security module of the security client.

The processor may be further configured to transmit a stop command to stop the running of an application program of the user terminal to the dynamic security module of the security client when a security problem has occurred in the user terminal.

The processor may be configured to create the security session by generating a session ID as a security session ID and then transmitting the session ID to the security client so that the security client stores the session ID.

The processor may be further configured to store parameters of the dynamic security module transmitted to the security client while the security session has been maintained.

The processor may be further configured to verify whether details transmitted from the security client are same as the configuration of the parameters of the dynamic security module.

The apparatus may further include storage configured to store the dynamic security module to be transmitted to the security client of the user terminal, the session ID to be used as the security session ID, and the parameters of the dynamic security module.

According to still another aspect of the present invention, there is provided a computer-readable storage medium having stored thereon a computer program that, when executed by a processor, causes the processor to execute the method.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, when it is determined that a detailed description of a related well-known component or function may unnecessarily make the gist of the present invention obscure, it will be omitted. Furthermore, in the following description of the embodiments of the present invention, a specific numerical value is merely an embodiment.

Figure 1:
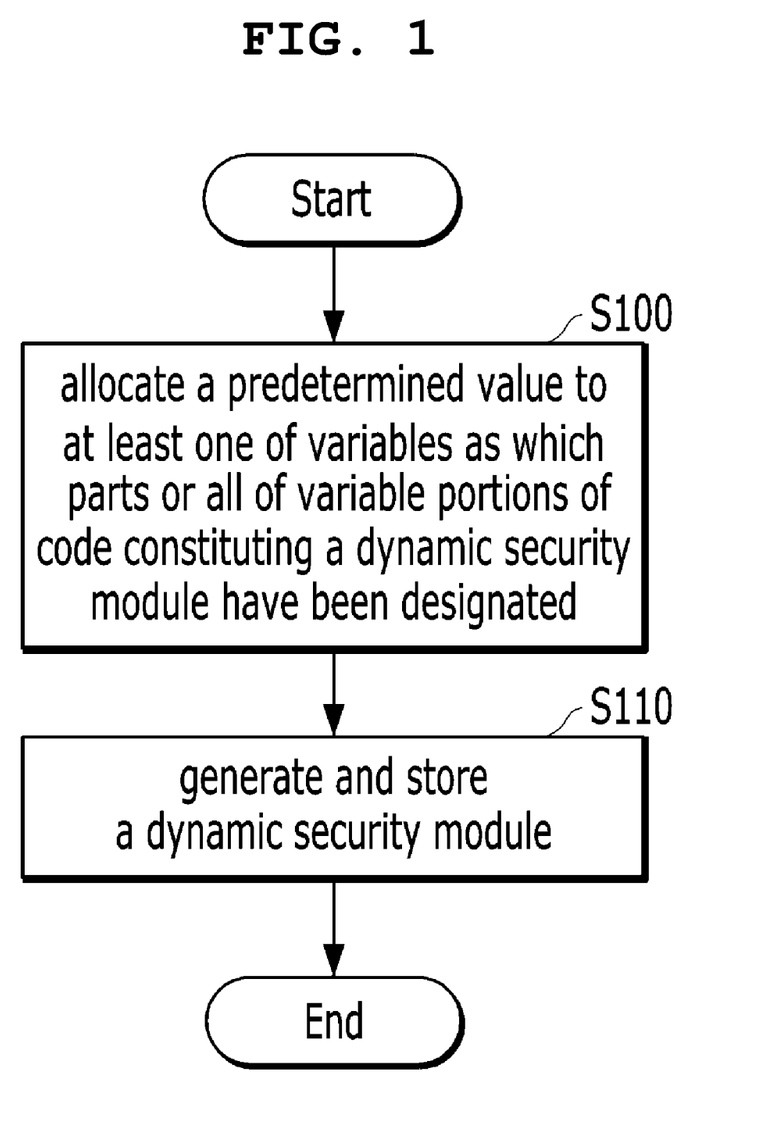
FIG. 1 is a flowchart showing the sequence of a method of generating a dynamic security module according to a first embodiment of the present invention.
Figure 2:
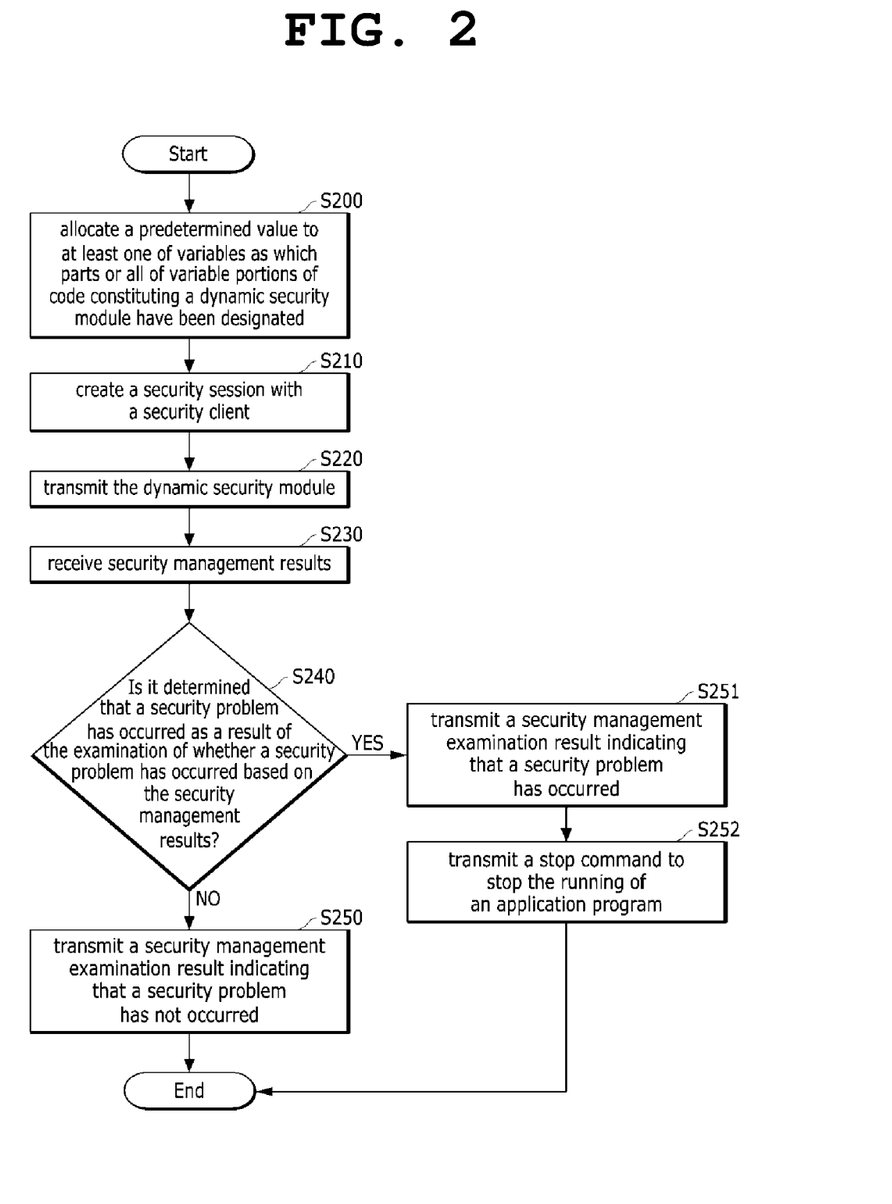
FIG. 2 is a flowchart diagram showing the sequence of a method of generating a dynamic security module according to a second embodiment of the present invention.

FIG. 1 is a flowchart showing the sequence of a method of generating a dynamic security module according to a first embodiment of the present invention, and FIG. 2 is a flowchart diagram showing the sequence of a method of generating a dynamic security module according to a second embodiment of the present invention.

Referring to these drawings, the method of generating a dynamic security module according to the first embodiment of the present invention is a method of generating a dynamic security module which is allocated to a user terminal so that code configured to be executed on the user terminal for security varies with execution time, the method including: step S100 of allocating a predetermined value to at least one of variables as which parts or all of the variable portions of code constituting a dynamic security module have been designated; and step S110 of generating and storing the dynamic security module so that part or all of the code of the dynamic security module transmitted to a user terminal has a predetermined valid period.

In other words, the method of generating a dynamic security module according to the present embodiment includes the step of allocating a predetermined value to at least one of variables in a dynamic security module in which parts or all of the variable portions of code constituting the dynamic security module have been designated as the variables, thereby enabling codes performing security management in the security client of a user terminal to be dynamically randomly selected and thus making it considerably difficult for a hacker to hack the dynamic security module, with the result that the security of the user terminal equipped with the dynamic security module can be significantly improved.

Furthermore, an advantage arises in that the configuration of the code of a dynamic security module which is frequently updated and performs security management in the security client of a user terminal is varied and thus different dynamic security modules having innumerable types of code configurations may be generated.

More specifically, the code in which parts or all of the variable portions of the code for each function performing security management in the security client of a user terminal have been designated as variables is used, and the step of allocating a predetermined value to at least one of the variable is included, thereby enabling innumerable types of dynamic security modules to be generated.

For example, the code in which parts "r" or all "n" of the variable portions of a dynamic security module have been designated as variables is used, and thus the combination nCr of a plurality of variable portions may be generated and used using the following combination equation:

$$nCr = \frac{n(n-1)(n-2) \ldots (n-r+1)}{r(r-1)(r-2) \ldots \cdot 2 \cdot 1} = \frac{n!}{r!(n-1)!}$$

where r is n≥r.

Furthermore, when a predetermined value is allocated to a code designated as a variable by using various types of codes a regarding variable codes stored in the apparatus for performing the method of generating a dynamic security module, the type of allocated value b may be generated as the following combination aCb:

$$aCb = \frac{a(a-1)(a-2) \ldots (a-b+1)}{b(b-1)(b-2) \ldots \cdot 2 \cdot 1} = \frac{a!}{b!(a-b)!}$$

where b is a≥b.

Accordingly, the method of generating a dynamic security module is characterized in that innumerable types of code which are executed on the user terminal for security can be generated.

Furthermore, the dynamic security module is configured such that part or all of code constituting the dynamic security module transmitted to a user terminal has a predetermined valid period, and the dynamic security module transmitted to the security client of the user terminal is allowed to be frequently updated, thereby effectively preventing a security problem from occurring in application programs installed on the user terminal due to the hacking of the security module, computer virus infection, or the like.

Each of the variable portions of the dynamic security module may be code capable of varying at least one element selected from the group consisting of, for example, the function name of the code, a variable designating an algorithm to be executed, a protocol field, a variable designating a protocol sequence, a variable designating a compile level, and a variable designating an executable code obfuscation method.

In other words, innumerable types of dynamic security modules may be generated by varying the remaining variable codes, each capable of varying at least one element selected from the group consisting of, for example, the function name of code, a variable designating an algorithm to be executed, a protocol field, a variable designating a protocol sequence, a variable designating a compile level, and a variable designating an executable code obfuscation method, exclusive of fixed codes invariable when the dynamic security module is newly updated, such as codes adapted to implement execution start points, from among codes constituting a dynamic security module.

In this case, the protocol field is a protocol for performance methods, etc. regarding various items of the security management which is performed by the dynamic security module in a security client. For example, the protocol field may be a communication protocol adapted to transmit the result of the determination of whether an element which may be a hacking threat to an application program including a security client is present, or a communication protocol adapted to transmit the details of the self treatment of a file computer virus for the application program, a file boot & file computer virus, and/or the like.

Furthermore, the protocol sequence refers to the performance sequence of various items including security management which is performed by the dynamic security module in a security client. For example, the protocol sequence may be the sequence of the detection of hacking threat elements, including the forgery or alteration of the O/S of a terminal on which an application program has been installed, the forgery or alteration of an app, rooting, a debugger, a root process execution history, the installation of a malicious application, a malicious application execution history, a malicious port, the forgery or alteration of a session, the forgery or alteration of an input value, and a computer virus.

Furthermore, the compile level enables optimized compiling to be performed using a compiler for the purpose of the smooth execution of a security management function when the source code of the dynamic security module is built into executable machine language in the security client. In this case, in addition to the optimization level of the code, various levels may be generated. Innumerable different types of dynamic security modules may be generated by varying the compile level of the code constituting the dynamic security module. Furthermore, the different compile levels of the source code may be implemented by, for example, not only a server device for generating the dynamic security module but also the security client of a user terminal.

Furthermore, the predetermined valid period of the part or all of the code of the dynamic security module performing the security management may be set to a time interval selected from the group consisting of, for example, one hour, three hours, six hours, nine hours, 12 hours, 24 hours, 48 hours, and 72 hours. When the predetermined valid period expires, the part or all of the code of the dynamic security module may be deleted or not used. Accordingly, when the predetermined valid period of the dynamic security module expires, the security client may stop the use of the dynamic security module, may receive a new dynamic security module from a dynamic security module server device, and may perform update, thereby effectively preventing a security problem from occurring in the user terminal due to the hacking of the dynamic security module or computer virus infection.

The method of generating a dynamic security module according to the second embodiment of the present invention is a method of generating a dynamic security module which is allocated to a user terminal so that code configured to be executed on the user terminal for security varies with execution time, the method including: step S200 of allocating a predetermined value to at least one of variables as which parts or all of the variable portions of code constituting a dynamic security module have been designated; step S210 of allowing part or all of the code constituting the dynamic security module transmitted to a user terminal to have a predetermined valid period, and generating a security session with the security client of the user terminal; and step 220 of transmitting the dynamic security module to the security client of user terminal in which the security session has been created.

In other words, the method of generating a dynamic security module according to the second embodiment of the present invention is configured to: generate a dynamic security module so that part or all of the code performing security management in the security client of a user terminal has a predetermined valid period; generate a security session with the security client of the user terminal in one of various cases, such as in the case where the user terminal operates, in the case where an application program including the security client runs on the user terminal, in the case of a user request from the user terminal, at a predetermined period set in a dynamic security module server device, at a predetermined period set in the user terminal, etc.; and transmitting the dynamic security module to the security client of the user terminal; thereby allowing the dynamic security module to be frequently updated and thus more effectively preventing a security problem from occurring in application programs installed on the user terminal due to the hacking of the security module, computer virus infection, or the like.

The method of generating a dynamic security module according to the present embodiment further includes: step 230 of receiving security management results from the dynamic security module transmitted to the security client; step 240 of determining whether a security problem has occurred by examining the received security management results; and step S250 of, when a security problem has not occurred in the user terminal, transmitting a security management examination result value indicating that a security problem has not occurred to the dynamic security module of the security client.

In this case, when a security problem has occurred in the user terminal, step S251 of transmitting a security management examination result value, indicating that a security problem has occurred, to the dynamic security module of the security client is performed.

Furthermore, when a security problem has occurred in the user terminal, step S252 of transmitting a stop command to stop the running of an application program of the user terminal to the dynamic security module of the security client may be further performed.

In other words, the method of generating a dynamic security module according to the present embodiment is configured to receive security management results from the dynamic security module transmitted to the security client of the user terminal, to examine the security management results, and to, in turn, transmit a security management examination result value to the dynamic security module, thereby enabling the dynamic security module to rapidly and effectively deal with a case where a security problem has occurred in the user terminal.

In connection with this, the method of generating a dynamic security module according to the present embodiment may be configured to receive security management results from the dynamic security module transmitted to the security client as security management, to examine the received security management results, and to, when a security problem has occurred in the user terminal, transmit a stop command to stop the running of an application program of the user terminal to the dynamic security module of the security client and discard the security session with the security client, thereby fundamentally preventing the problem in which a hacker hacks the dynamic security module and causes a security problem in various types of application programs of the user terminal.

In other words, when a security problem has occurred in the user terminal, the running of an application program installed on the user terminal is rapidly stopped. As a result, the security problem can be prevented from being additionally spread to other application programs installed on the user terminal by the running of the former application program, and the tracking and analysis of the dynamic security module or dynamic security module server device by a hacker can be rapidly blocked by discarding the security session.

In this case, the security management is a concept including overall management which is performed by the dynamic security module for the purpose of the security of the user terminal, such as: detecting whether an element which may be a hacking threat to an application program including the security client is present; detecting hacking threat elements, including the forgery or alteration of the O/S of the terminal on which the application program has been installed, the forgery or alteration of an app, rooting, debugger and root process execution histories, the installation of a malicious application, a malicious application execution history, a malicious port, the forgery or alteration of a session, the forgery or alteration of an input value, and a computer virus; transmitting information about the hacking threat elements to the dynamic security module server device; treating a computer virus related to the application program; transmitting a stop command to stop the running of the application program in order to prevent a hacking threat and a computer virus infection problem from occurring in the application program; stopping the function of the dynamic security module itself due to a problem, such as the expiration of the predetermined valid period of the dynamic security module, the hacking of a hacker, computer virus infection, or the like; etc.

Furthermore, the security management event received from the user terminal may be one of various events, such as details used to determine the parameters of the dynamic security module transmitted from the security client, the details of the states in which the dynamic security module runs, security management result information indicating that there has been a hacking threat, the details of the treatment of computer viruses for an application program installed on the user terminal, etc.

In this case, the security management results are the details of security management which has been actually performed by the dynamic security module in the security client. The security management results are the result values of the performance of detailed security management functions included in the dynamic security module, and are part of a security management event. For example, the security management results may be the details of the result of the detection of the presence or absence of an element which may be a hacking threat, the result of the detection of an element which may be a hacking threat, the result of the treatment of a computer virus for an application program, the result of the removal of an element which may be a hacking threat, etc.

Furthermore, the security management examination result value is a determination result obtained when the dynamic security module server device receives the security management result and analyzes whether a security problem has occurred in the user terminal based on the security management result. In other words, the security management examination result value may be the result of the determination of whether an element which may be a current hacking threat to the user terminal is present, the result of the determination whether an application program installed on the user terminal has been hacked, or the result of the determination of whether an application program has been infected with a computer virus or malware.

The method of generating a dynamic security module may be configured to create the security session by generating and storing a session ID as a security session ID and transmitting the session ID to the security client so that the security client can store the session ID. This method of creating a security session using a session ID has the advantage of creating a plurality of security sessions and frequently updating the security sessions, thereby improving the reliability and convenience of the security management of the dynamic security module for the user terminal.

In this case, the security session may be created with the security client of an authenticated user terminal. In other words, the creation of the security session may include the authentication of the security client of the user terminal for the transmission of the dynamic security module in order to further improve the security of the user terminal.

Furthermore, the authentication of the security client of the user terminal may be completed, for example, at the same time that an application, i.e., the application program including the security client, is installed on the user terminal, when an application is first run after being installed on the user terminal, upon logging in to or logging out of an application, or in response to a request from a user via an application after the application has been installed on the user terminal.

The method of generating a dynamic security module may further include the step of allowing the parameters regarding each dynamic security module transmitted to the security client while the security session is being maintained.

In this case, the parameters regarding the dynamic security module is specific information about the function name of code adapted to perform the security management of the dynamic security module transmitted to the security client and performing security management, a variable adapted to designate an algorithm to be executed, a protocol field, a variable adapted to designate a protocol sequence, a variable adapted to designate a compile level, a variable adapted to designate an executable code obfuscation method, etc. The parameters regarding the dynamic security module are intended to distinguish individual dynamic security modules which are frequently updated and have different configurations, and are determined by the dynamic security module server device. The parameters regarding the dynamic security module are information when the code adapted to perform the security management of the dynamic security module is executed.

Furthermore, the method of generating a dynamic security module may further include the step of receiving details regarding dynamic security modules transmitted to the security client and verifying whether the details are the same as the configurations of the stored parameters of the dynamic security modules. In the verification of changes in the parameters of the dynamic security modules, when it is determined that the sequentially transmitted parameters of the dynamic security modules, for example, A-B-C-D, are different from details transmitted from the security client through comparison therebetween, it may be inferred that there has been a hacking attempt of a hacker or the like, and countermeasures against this may be taken.

Figure 3:
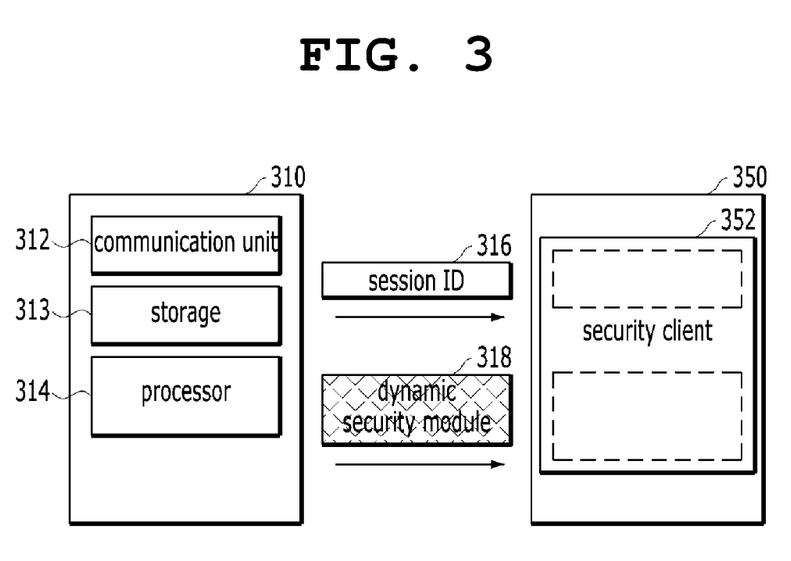
FIG. 3 is a block diagram showing the schematic configuration of an apparatus for generating a dynamic security module according to the present invention.

FIG. 3 is a schematic diagram showing the schematic configuration of an apparatus 310 for generating a dynamic security module according to the present invention.

Referring to FIG. 3, the apparatus 310 for generating a dynamic security module according to the present invention is an apparatus for generating a dynamic security module 318 which is allocated to a user terminal 350 so that code configured to be executed on the user terminal 350 for security varies with execution time, the apparatus including: a communication unit 312 configured to transmit and receive a security management event over a network; and a processor 314 configured to control the communication unit 312; wherein the processor 314 allocates a predetermined value to at least one of variables as which parts or all of the variable portions of the code constituting the dynamic security module 318 have been designated, and part or all of the code constituting the dynamic security module 318 transmitted to the user terminal 350 has a predetermined valid period.

In other words, in the apparatus 310 for generating a dynamic security module according to the present invention, the processor 310 may store dynamic security modules 318 in each of which part or all of the code performing security management in the security client 353 of the user terminal 350 has a predetermined valid period or generate such dynamic security modules 318 upon transmission, may generate a security session with the security client 352 of the user terminal 350 in one of various cases, such as in the case where the user terminal 350 operates, in the case where an application program including the security client 352 runs on the user terminal 350, in the case of a user request from the user terminal 350, at a predetermined period set in a dynamic security module server device 310, at a predetermined period set in the user terminal 350, etc.; and transmitting the dynamic security modules 318 to the security client 352 of the user terminal 350; thereby allowing the dynamic security modules 318 to be frequently updated and thus more effectively preventing a security problem from occurring in application programs installed on the user terminal due to the hacking of the security module, computer virus infection, or the like.

Each of the variable portions of the dynamic security module may be code capable of varying at least one element selected from the group consisting of, for example, the function name of code, a variable designating an algorithm to be executed, a protocol field, a variable designating a protocol sequence, a variable designating a compile level, and a variable designating an executable code obfuscation method.

In other words, innumerable types of dynamic security modules may be generated by varying the remaining variable codes, each capable of varying at least one element selected from the group consisting of, for example, the function name of code, a variable designating an algorithm to be executed, a protocol field, a variable designating a protocol sequence, a variable designating a compile level, and a variable designating an executable code obfuscation method, exclusive of fixed codes invariable when the dynamic security module is newly updated, such as codes adapted to implement execution start points, from among codes constituting a dynamic security module.

Furthermore, the security management event received from the user terminal 350 may be one of various events, such as details used to determine the parameters of the dynamic security module 318 transmitted from the security client 352, the details of the states in which the dynamic security module 318 runs, security management result information indicating that there has been a hacking threat, the details of the treatment of computer viruses for an application program installed on the user terminal 150, etc.

Furthermore, the user terminal 350 may be one of various terminals requiring security, for example, a smartphone, a tablet PC, a desktop computer, a notebook computer, etc.

The processor 314 may be further configured to receive security management results from a dynamic security module 318 transmitted to the security client 152, to examine the received security management results, and transmit a security management examination result value to the dynamic security module 318 of the security client 352.

More specifically, the processor 314 may be further configured to receive security management results from the dynamic security module 318 transmitted to the security client 352 as security management, to examine the received security management results, and, when a security problem has not occurred in the user terminal 350, transmit a security diagnosis examination result value indicating that a security problem has not occurred to the dynamic security module 318 of the security client 352.

Furthermore, the processor 314 may be further configured to receive security management results from the dynamic security module 318 transmitted to the security client 352 as security management, to examine the received security management results, and to, when a security problem has occurred in the user terminal 350, transmit a security management examination result value indicating that a security problem has occurred to the dynamic security module 318 of the security client 352.

In other words, the apparatus 310 for generating a dynamic security module according to the present invention is configured to receive security management results from the dynamic security module 318 transmitted to the security client 352 of the user terminal 350 and to, in turn, transmit a security management examination result value to the dynamic security module 318, thereby enabling the dynamic security module 318 to rapidly and effectively deal with a case where a security problem has occurred in the user terminal 150.

In connection with this, the processor 314 may be configured to receive security management results from the dynamic security module 318 transmitted to the security client 352 as security management, to examine the received security management results, and to, when a security problem has occurred in the user terminal 350, transmit a stop command to stop the running of an application program of the user terminal 350 to the dynamic security module 118 of the security client 352 and discard the security session with the security client 352, thereby fundamentally preventing the problem in which a hacker hacks the dynamic security module 318 and causes a security problem in various types of application programs of the user terminal 350.

Meanwhile, the processor 314 may be configured to create the security session by generating and storing a session ID 316 as a security session ID and transmitting the session ID 316 to the security client 352 so that the security client 352 can store the session ID 316. This method of creating a security session using a session ID has the advantage of creating a plurality of security sessions and frequently updating the security sessions, thereby improving the reliability and convenience of the security management of the dynamic security module 318 for the user terminal 350.

The predetermined valid period may be configured to delete the part or all of code or block the use of the part or all of code when the predetermined valid period expires. In other words, the dynamic security module 318 in which part or all of the code performing security management in the security client 352 of the user terminal 350 has a predetermined valid period may be configured to delete the part or all of the code or stop the use of itself not to perform security management when the predetermined valid period expires.

Accordingly, when the predetermined valid period of the dynamic security module 318 expires, the security client 352 updates part or all of code constituting the dynamic security module 318, thereby fundamentally blocking the occurrence of a security problem attributable to a cause, such as the hacking of the dynamic security module 318, computer virus infection, or the like.

Furthermore, the processor 314 may be configured to store the parameters of each dynamic security module 318 transmitted to the security client 352 while the security session is being maintained.

In this case, the parameters regarding the dynamic security module 318 is specific information regarding about the function structure of the code of the dynamic security module transmitted to the security client 352 and performing security management, the type of algorithm, a compile level, etc. The parameters regarding the dynamic security module 318 are intended to distinguish dynamic security modules which are frequently updated and have different configurations, and are determined by the dynamic security module server device 310. Accordingly, part or all of the code of the security client is changed by the parameters.

Furthermore, the processor 314 is configured to receive details regarding dynamic security modules 318 transmitted to the security client 352 and to verify whether the details are the same as the configuration of the stored parameters of the dynamic security module 318. In the verification of changes in the parameters of the dynamic security modules, when it is determined that the sequentially transmitted parameters of the dynamic security modules, for example, A-B-C-D, are different from details transmitted from the security client 352 through comparison therebetween, it may be inferred that there has been a hacking attempt of a hacker or the like, and countermeasures against this may be taken.

The apparatus 310 for generating a dynamic security module may further include storage 313 configured to store the dynamic security module 318 transmitted to the security client 352 of the user terminal 350, the session ID 316 used as a security session ID, and the parameters regarding the dynamic security module 318.

In other words, the dynamic security module server device 310 stores the dynamic security module 318 and the session ID 316 in the storage 313, thereby enabling the dynamic security module 318 and the session ID 316 to be smoothly and stably transmitted to the security client 352. Furthermore, the parameters regarding the dynamic security modules to be transmitted to the security client 352 are stored in the storage 313, thereby enabling the verification of identity with the details of the reception of the dynamic security modules 318 to be transmitted to the security client 352 to be more stably performed.

Figure 4:
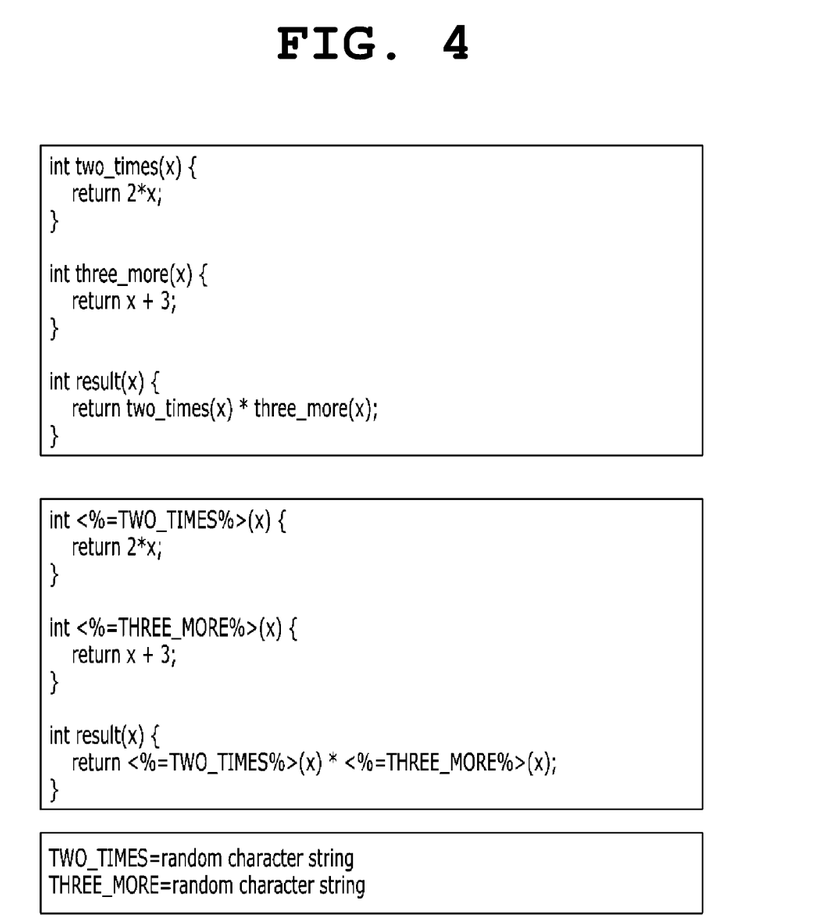
FIG. 4 is a schematic diagram showing an example of the generation of dynamic codes including different functions in a method of generating a dynamic security module according to an embodiment of the present invention.
Figure 5:
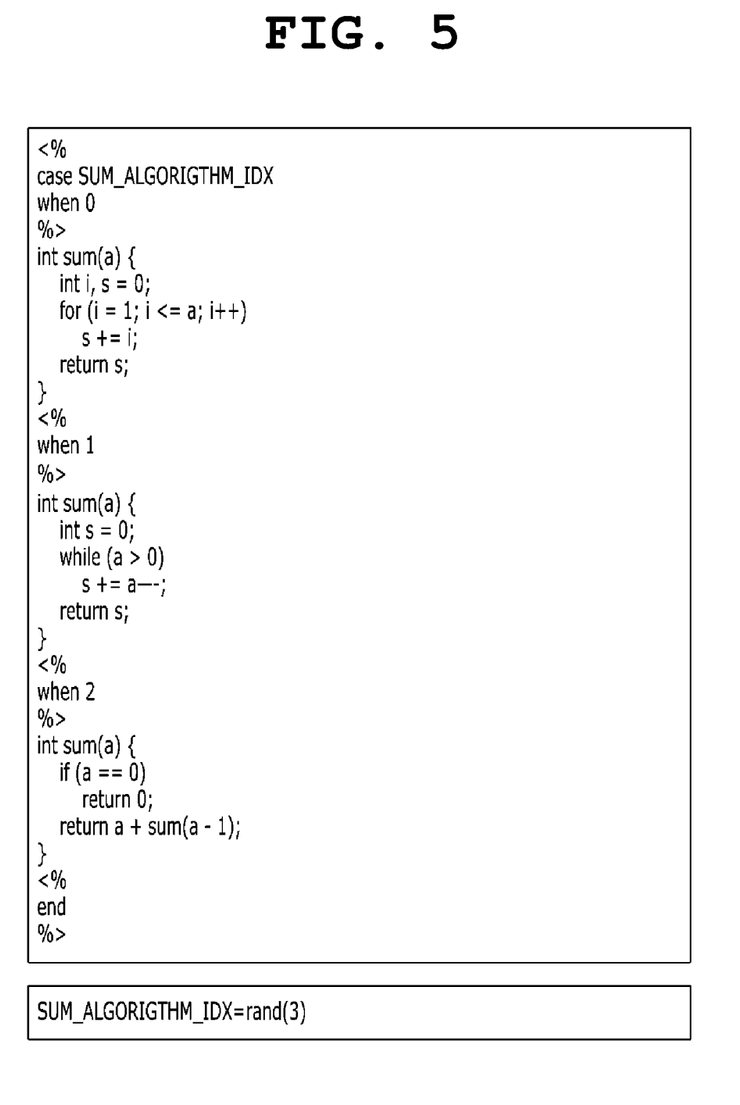
FIG. 5 is a schematic diagram showing an example of the generation of dynamic algorithms including different algorithms in a method of generating a dynamic security module according to an embodiment of the present invention.
Figure 6:
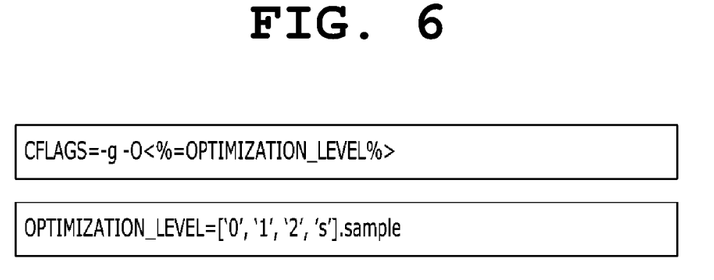
FIG. 6 is a schematic diagram showing an example of the generation of dynamic compile parameters including different compile levels in a method of generating a dynamic security module according to an embodiment of the present invention.

FIG. 4 is a schematic diagram showing an example of the generation of dynamic codes including different functions in a method of generating a dynamic security module according to an embodiment of the present invention, FIG. 5 is a schematic diagram showing an example of the generation of dynamic algorithms including different algorithms in a method of generating a dynamic security module according to an embodiment of the present invention, and FIG. 6 is a schematic diagram showing an example of the generation of dynamic compile parameters including different compile levels in a method of generating a dynamic security module according to an embodiment of the present invention.

Referring to these drawings, in the method and apparatus for generating a dynamic security module according to the present invention, various different types of dynamic security modules may be generated by using variables selected from the group consisting of the Internet Protocol (IP) address of the user terminal received upon authentication of the security client, the number of a mobile phone, and a value generated by a random number generator when dynamic security modules are generated.

First, in the method and apparatus for generating a dynamic security module, dynamic security modules may be configured such that logics configured to generate security diagnosis performance results in the security client may be implemented as source codes including different functions which vary upon generation, as shown in the example of the generation of dynamic source codes shown in FIG. 4 (see the middle of FIG. 4).

In the case of conventional general source codes, specific function names corresponding to the source codes are immediately exposed upon analysis of the source codes, as shown in the example of the generation shown in FIG. 4 (see the top of FIG. 4), and thus it is considerably easy for a hacker to identify a main logic composed of the source codes. In contrast, in the case of the dynamic security module according to the present invention, dynamic source codes are implemented in such a manner that the function names and/or the like of source codes are not fixed, parameters (exemplified by characters or character strings in the present embodiment) randomly designated by the security server are allocated to variables <%=TWO_TIMES %> and <%=THREE_MORE %>, and such parameters are newly allocated when a predetermined valid period expires, as shown in the example of the generation shown in FIG. 4 (the middle of FIG. 4), thereby making it considerably difficult for a hacker to identify the main logics of the dynamic security modules. These dynamic source codes may be easily implemented using, for example, a template framework.

Furthermore, the dynamic security modules according to the present invention may be configured such that logics performing the same security management function are implemented using, for example, three different algorithms and one of the three algorithms is selected as an algorithm for performing security management, as shown in the example of the generation of the dynamic algorithms of the dynamic security modules shown in FIG. 5, thereby requesting a different type of algorithm analysis from a hacker each time and thus making the hacking the dynamic security module itself considerably difficult.

Furthermore, the dynamic security modules according to the present invention are generated as various levels of compile results as well as an optimization level of compile result during the process of generating the dynamic security modules, as shown in the example of the generation of dynamic compile parameters shown in FIG. 6, thereby making the code configurations of respective generated dynamic security modules different.

Figure 7:
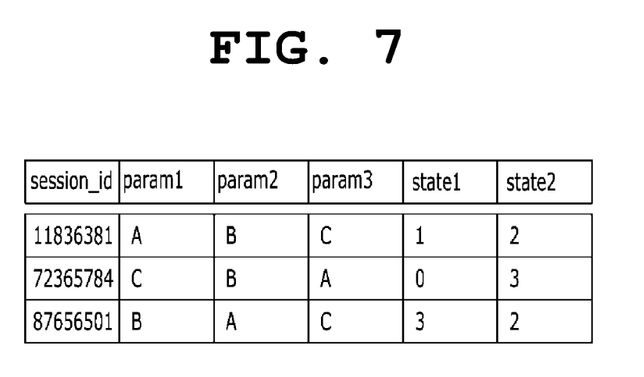
FIG. 7 is a schematic diagram showing an example of the generation of session IDs and the parameters of dynamic security modules in a method of generating a dynamic security module according to an embodiment of the present invention.
Figure 8:
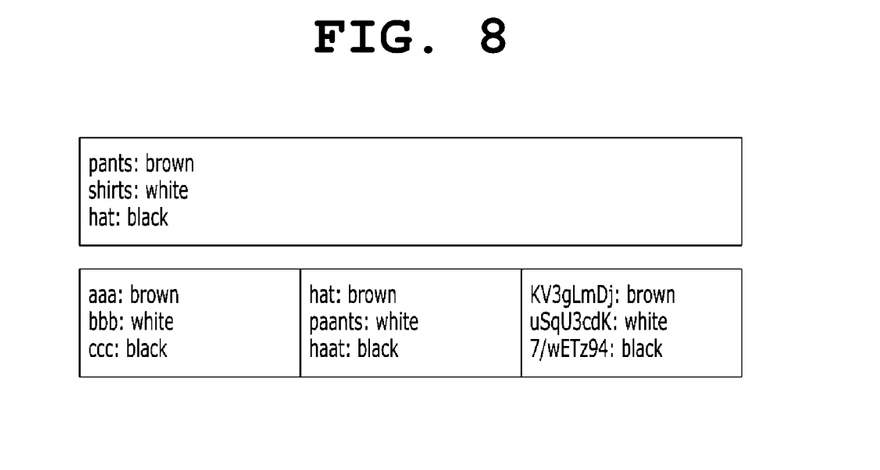
FIG. 8 is a schematic diagram showing an example of the generation of the protocol fields of dynamic security modules in a method of generating a dynamic security module according to an embodiment of the present invention.
Figure 9:
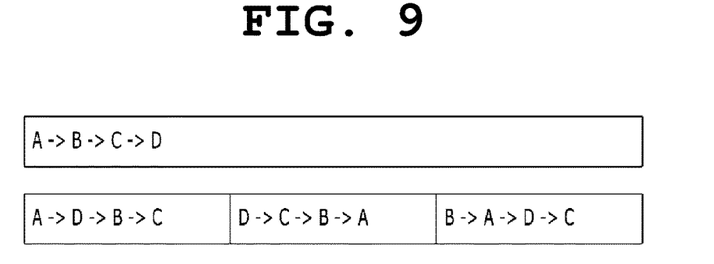
FIG. 9 is a schematic diagram showing an example of the generation of the protocol sequences of dynamic security modules in a method of generating a dynamic security module according to an embodiment of the present invention.

FIG. 7 is a schematic diagram showing an example of the generation of session IDs and the parameters of dynamic security modules in a method of generating a dynamic security module according to an embodiment of the present invention, FIG. 8 is a schematic diagram showing an example of the generation of the protocol fields of dynamic security modules in a method of generating a dynamic security module according to an embodiment of the present invention, and FIG. 9 is a schematic diagram showing an example of the generation of the protocol sequences of dynamic security modules in a method of generating a dynamic security module according to an embodiment of the present invention.

Referring to these drawings, in the method of generating a dynamic security module according to the present invention, when a security session is generated, a session ID may be generated as a security session ID, the session ID may be stored in the processor of the server device, and the session ID may be transmitted to the security client so that the security client stores the session ID, as shown in the example of the generation of session IDs and the parameters of dynamic security modules shown in FIG. 7, thereby generating a security session. Furthermore, while the security session is being maintained, the parameters of generated dynamic security modules may be stored.

In other words, as shown in FIG. 7, for example, in the method of generating a dynamic security module, when the dynamic security module server device and the security client of the user terminal have created a security session by generating 11836381 as a session ID, it may be verified whether details regarding the dynamic security module transmitted from the security client are parameters A, B, and C and states 1, and 2. When the dynamic security module server device and the security client of the user terminal have created a security session by generating 72365784 as a session ID, it may be verified whether details regarding the dynamic security module transmitted from the security client are parameters C, B, and A and states 0, and 3. Furthermore, When the dynamic security module server device and the security client of the user terminal have created a security session by generating 87656501 as a session ID, it may be verified whether details regarding the dynamic security module transmitted from the security client are parameters B, A, and C and states 3, and 2. In this case, the details of the parameters and the states may be security management events received from the user terminal.

Furthermore, different variations time intervals and the different transmission time intervals of dynamic security modules are set for respective security sessions, thereby making it difficult for a hacker to analyze the dynamic security modules.

Furthermore, in the method of generating a dynamic security module according to the present invention, different protocol fields (brown, white, and black) with the security client may be set for respective generated dynamic security modules and transmitted to the security client of the user terminal, as shown in the example of the generation of the protocol fields of dynamic security modules shown in FIG. 8.

When the protocol fields of dynamic security modules transmitted to the security client are different from each other, a hacker needs to analyze all the different protocol fields, and the hacking of the dynamic security modules becomes more difficult.

Furthermore, in the method of generating a dynamic security module according to the present invention, the protocol sequence A→B→C→D of the dynamic security module which is executed in the security client is differently set, for example, to A→D→B→C, D→C→B→A, and B→A→D→C for respective generated dynamic security modules, and the different sequences are transmitted to the security client, as shown in the example of the generation of the protocol sequences of dynamic security modules shown in FIG. 9, thereby enabling the performance sequence of detailed functions performing security management to be differently implemented each time and thus generating dynamic security modules which are more difficult to hack.

The apparatus 310 for generating a dynamic security module according to the present invention processor 314 includes the communication unit 312 and the storage 313.

The processor 314 may generate control signals, and may control the apparatus 310 for generating a dynamic security module, including the communication unit 312 and the storage 313. In this case, the communication unit 312 may exchange data with an external device through communication using various protocols, and may connect with an external network via a wired or wireless connection and transmit and receive digital data, such as content, an application, etc.

Furthermore, the storage 313 is a device capable of storing various types of digital data including an audio, a photo, a moving image, an application, etc. The storage 313 refers to one of various types of digital data storage spaces, such as flash memory, Random Access Memory (RAM), Solid State Drive (SSD), etc. The storage 313 may temporarily store data received from an external device via the communication unit 312.

Each of the methods of generating a dynamic security module according to the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software.

The method and apparatus for generating a dynamic security module according to the present invention have the advantage of generating dynamic security modules in each of which part or all of source code performing security management has a predetermined valid period, transmitting the dynamic security modules to the security client of a user terminal, and allowing security modules for various types of application programs of the user terminal to be frequently updated, thereby making the hacking of the application programs difficult and thus significantly improving the security of the user terminal.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A method of generating a dynamic security module, the method comprising:

allocating by a processor a first set of parameters to at least one of variable elements within a code constituting the dynamic security module, wherein parts of the code that are dynamically changeable have been designated as the variable elements;

changing the code of the dynamic security module based on the first set of parameters of the dynamic security module;

transmitting the dynamic security module to a user terminal;

receiving a security management event from the user terminal, wherein the security management event includes a second set of parameters of the dynamic security module that is running on a security client of the user terminal;

verifying by the dynamic security module server device whether the second set of parameters of the dynamic security module that is running on the security client of the user terminal match with the first set of parameters allocated by the processor; and in response to detecting that the second set of parameters is different from the first set of parameters, causing the user terminal to stop running of an application program, wherein the variable elements include at least one of a function name, a variable that designates an algorithm to be executed, a protocol field, a variable that designates a protocol sequence, a variable that designates a compile level, or a variable that designates an executable code obfuscation method, and wherein the code has a predetermined valid period after which part or all of the code of the dynamic security module is changed.

2. The method of claim 1, further comprising:

creating by the processor a security session with a security client of the user terminal; and transmitting by the processor the dynamic security module to the security client of the user terminal in which the security session has been created.

3. The method of claim 2, further comprising receiving by the processor security management results from the dynamic security module transmitted to the security client, examining the received security management results, and transmitting a security management examination result value to the dynamic security module of the security client.

4. The method of claim 2, further comprising transmitting by the processor a stop command to stop running of the application program of the user terminal to the dynamic security module of the security client when a security problem has occurred in the user terminal other than expiration of the predetermined valid period.

5. The method of claim 2, wherein the security session is created by generating a session ID as a security session ID and then transmitting the session ID to the security client so that the security client stores the session ID.

6. The method of claim 2, further comprising storing by the processor the first set of parameters of the dynamic security module transmitted to the security client while the security session has been maintained.

7. An apparatus for generating a dynamic security module, the apparatus comprising:

a transmitter to transmit the dynamic security module over a network;

a receiver to receive a security management event over the network; and a processor configured to:

allocate a first set of parameters to at least one of variable elements within a code constituting the dynamic security module, wherein parts of the code that are dynamically changeable have been designated as the variable elements;

change the code of the dynamic security module based on the first set of parameters of the dynamic security module;

receive a security management event from a user terminal, wherein the security management event includes a second set of parameters of the dynamic security module that is running on a security client of the user terminal;

verify whether the second set of parameters of the dynamic security module that is running on the security client of the user terminal match with the first set of parameters allocated by the processor; and in response to detecting that the second set of parameters is different from the first set of parameters, cause the user terminal to stop running of an application program, wherein the variable elements include at least one of a function name, a variable that designates an algorithm to be executed, a protocol field, a variable that designates a protocol sequence, a variable that designates a compile level, or a variable that designates an executable code obfuscation method, and wherein the security session has a predetermined valid period after which part or all of the code of the dynamic security module is changed.

8. The apparatus of claim 7, wherein the processor is further configured to:

create a security session with a security client of the user terminal; and transmit the dynamic security module to the security client of the user terminal in which the security session has been created.

9. The apparatus of claim 8, wherein the processor is further configured to:

receive security management results from the dynamic security module transmitted to the security client;

examine the received security management results; and transmit a security management examination result to the dynamic security module of the security client.

10. The apparatus of claim 8, wherein the processor is further configured to transmit a stop command to stop running of the application program of the user terminal to the dynamic security module of the security client when a security problem has occurred in the user terminal other than expiration of the predetermined valid period.

11. The apparatus of claim 8, wherein the processor is configured to create the security session by generating a session ID as a security session ID and then transmitting the session ID to the security client so that the security client stores the session ID.

12. The apparatus of claim 11, further comprising a storage configured to store the dynamic security module to be transmitted to the security client of the user terminal, the session ID to be used as the security session ID, and the first set of parameters of the dynamic security module.

13. The apparatus of claim 8, wherein the processor is further configured to store the first set of parameters of the dynamic security module transmitted to the security client while the security session has been maintained.

* * * * *